United States Patent
Barghouti et al.

(10) Patent No.: US 6,535,521 B1
(45) Date of Patent: Mar. 18, 2003

(54) DISTRIBUTED SPEECH CODER POOL SYSTEM WITH FRONT-END IDLE MODE PROCESSING FOR VOICE-OVER-IP COMMUNICATIONS

(75) Inventors: Rashad Barghouti, San Diego, CA (US); John Jay Kaufman, Encinitas, CA (US); Farokh Parchekani, Northboro, ME (US); John Crawford LeVieux, Carlsbad, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/343,147

(22) Filed: Jun. 29, 1999

(51) Int. Cl.⁷ ............................... H04L 5/22
(52) U.S. Cl. ...................... 370/462; 370/468
(58) Field of Search .................. 370/252, 352, 370/462, 459, 468, 431; 709/231, 220, 228

(56) References Cited

U.S. PATENT DOCUMENTS

| | | | |
|---|---|---|---|
| 4,993,022 A | * 2/1991 | Kondo et al. ............ 370/462 |
| 5,668,857 A | 9/1997 | McHale |
| 5,781,617 A | 7/1998 | McHale et al. |
| 5,898,761 A | 4/1999 | McHale et al. |
| 5,905,781 A | 5/1999 | McHale et al. |
| 6,125,343 A | * 9/2000 | Schuster .................. 348/14.08 |
| 6,175,871 B1 | * 1/2001 | Schuster et al. ............. 370/252 |
| 6,243,366 B1 | * 6/2001 | Bradley et al. ............. 340/540 |
| 6,259,691 B1 | * 7/2001 | Naudus ...................... 370/352 |
| 6,304,574 B1 | * 10/2001 | Schoo et al. ................ 370/352 |

* cited by examiner

Primary Examiner—Wellington Chin
Assistant Examiner—William Schultz
(74) Attorney, Agent, or Firm—McDonnell Boehnen Hulbert & Berghoff (57) ABSTRACT

A system and method for managing resources in a distributed Voice-over-IP (VoIP) speech coder pool arrangement including multiple speech coders each comprised of a first number of front-end modules and a second number of back-end modules. Each call session has assigned thereto a front-end module and a back-end module cooperatively functioning as a speech coder. In a preferred embodiment, voice samples are passed through the assigned front-end module to the back-end module where they are encoded and placed as speech frames on the IP network. As soon as absence of speech is detected by a Voice Activity Detector (which may or may not be shared by multiple front-end modules), processing is handed over to the front-end module freeing up the back-end module to sit idle resulting in reduced power consumption. In alternate embodiment, the freed-up back-end module is reassigned to a new VoIP call session for maximum resource utilization.

34 Claims, 6 Drawing Sheets

DISTRIBUTED SPEECH CODER POOL SYSTEM WITH FRONT-END IDLE MODE PROCESSING FOR VOICE-OVER-IP COMMUNICATIONS

CROSS-REFERENCE TO RELATED APPLICATIONS

This application is related to U.S. patent application Ser. No. 09/164,879 filed Oct. 1, 1998 (Sullivan, et al.) entitled "System and Method for Providing High-Speed Data Access Using a Distributed Modem"; co-pending U.S. Patent Application entitled "Distributed XDSL Modem Pool with Front-End Idle Mode Processing", filed contemporaneously herewith; and co-pending U.S. Patent Application entitled "Distributed Voiceband Modem Pool with Front-End Idle Mode Processing", also filed contemporaneously herewith.

TECHNICAL FIELD

This invention relates to distributed modem pooling techniques for maximizing resource utilization in a packet-switched communication network with integrated telephony services, and more particularly, for maximizing resource utilization of the network during speech/voice processing.

BACKGROUND

Voice-over-IP (VoIP) is an emerging technology where packet-switched networks employ the Internet Protocol (IP) to offer telephony services. Examples of such networks are the Internet and private IP-based corporate local area and wide area networks (LANs and WANs). The main advantage of using this technology over Plain Old Telephone Service (POTS) is the cost savings obtained from its reduced bandwidth requirements. Unlike POTS/PSTN where a continuously available circuit-switched DSO (64 kbps) connection is dedicated to the call for its entire life, VoIP shares the network bandwidth with other information types like data and video. This is possible because speech in a VoIP network typically travels (is processed) at the low rate of either 6.3 kbps or 5.3 kbps. Therefore, for example, a corporation can use a portion of the bandwidth of its existing IP network to offer VoIP to its employees and, consequently, do away with their traditional phone services and their associated costs.

VoIP achieves its bandwidth efficiency through the use of two techniques: Speech Compression and Discontinuous Transmission (DTX). The former employs source encoding methods to represent the sampled voice signal in compressed form that can be decoded and decompressed later at the receiving end. The compression ratio achieved by this technique can be as high as 24:1, resulting in tremendous bandwidth reduction. In Discontinuous Transmission, bandwidth reductions are achieved by detecting silence in the phone conversation and, in response, either shutting down the transmitter on the non-speaking end or sending smaller frames than the regular speech ones. With DTX, the bandwidth can theoretically be halved since, ideally, in conversations one person is talking and the other is listening.

Figure 1:
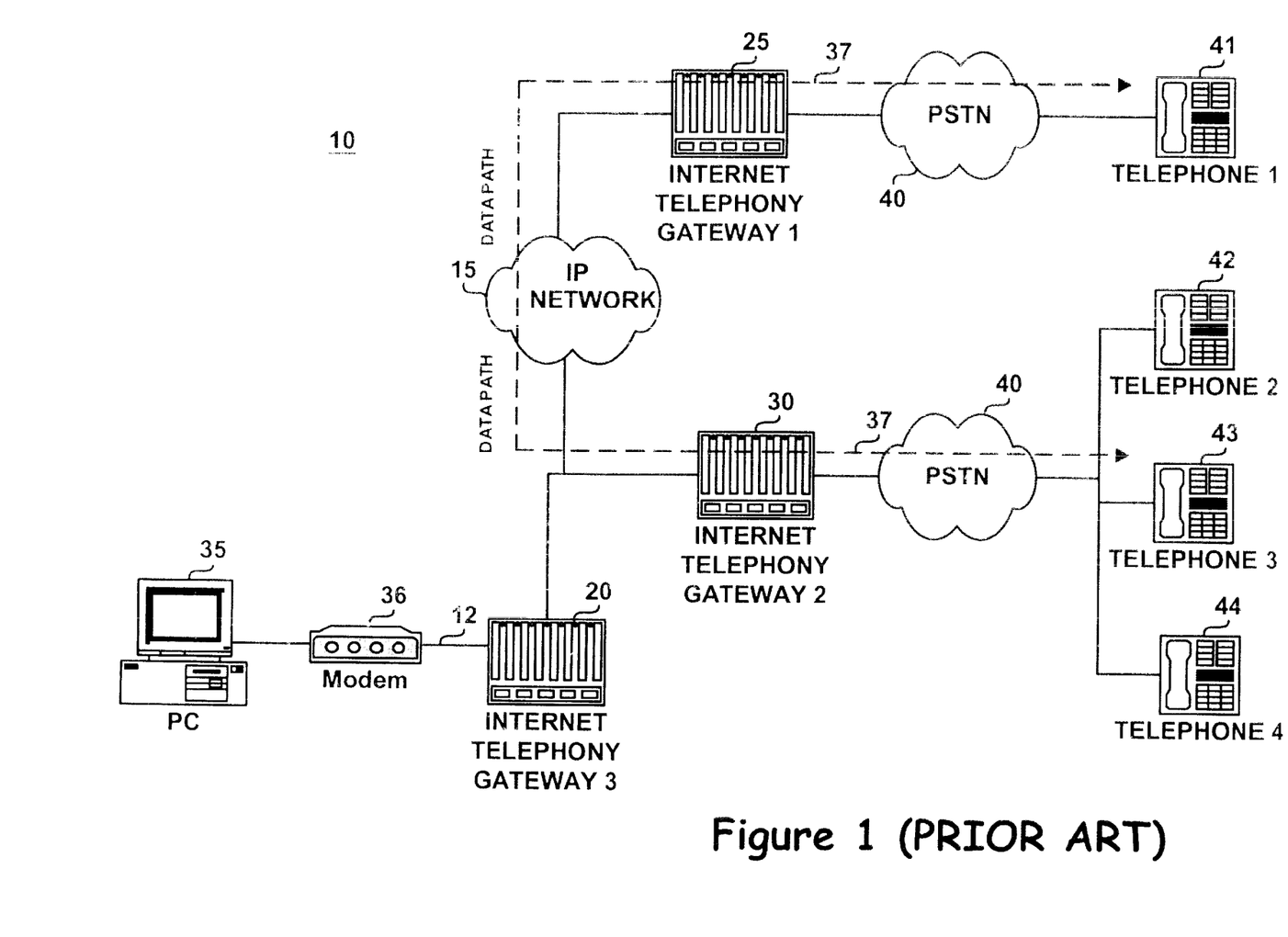
FIG. 1 illustrates the basic architecture of a typical VoIP WAN network.

FIG. 1 conceptually illustrates the basic architecture of a typical VoIP WAN network 10 like the internet. An IP network 15 forms the backbone of the WAN network. Telephone internet gateways 20, 25, 30 connected to the IP network provide the telecommunications interface infrastructure which allows the exchange of information—such as video, text, and/or speech—in the form of one or more recognized protocols between telephony-capable peripheral devices attached thereto. For example, one more personal computers 35 connected to an associated telephone gateway 20—using a modem 36 or the like equivalent device—are coupled to exchange information (including speech/voice information) therebetween or with other telephony devices (41–44) connected to the network 10—over for example the Public Switched Telephone Network (PSTN) 40—via their associated telephone gateways 25, 30. (Telephony devices 41–44 can include both wireless as well as wireline devices interfaced thereto in a conventional manner over the PSTN or a dedicated telephony-based network.) The PSTN or the like interface network receives and converts speech data into digital samples which are then communicated to the associated internet telephony gateway.

Figure 2:
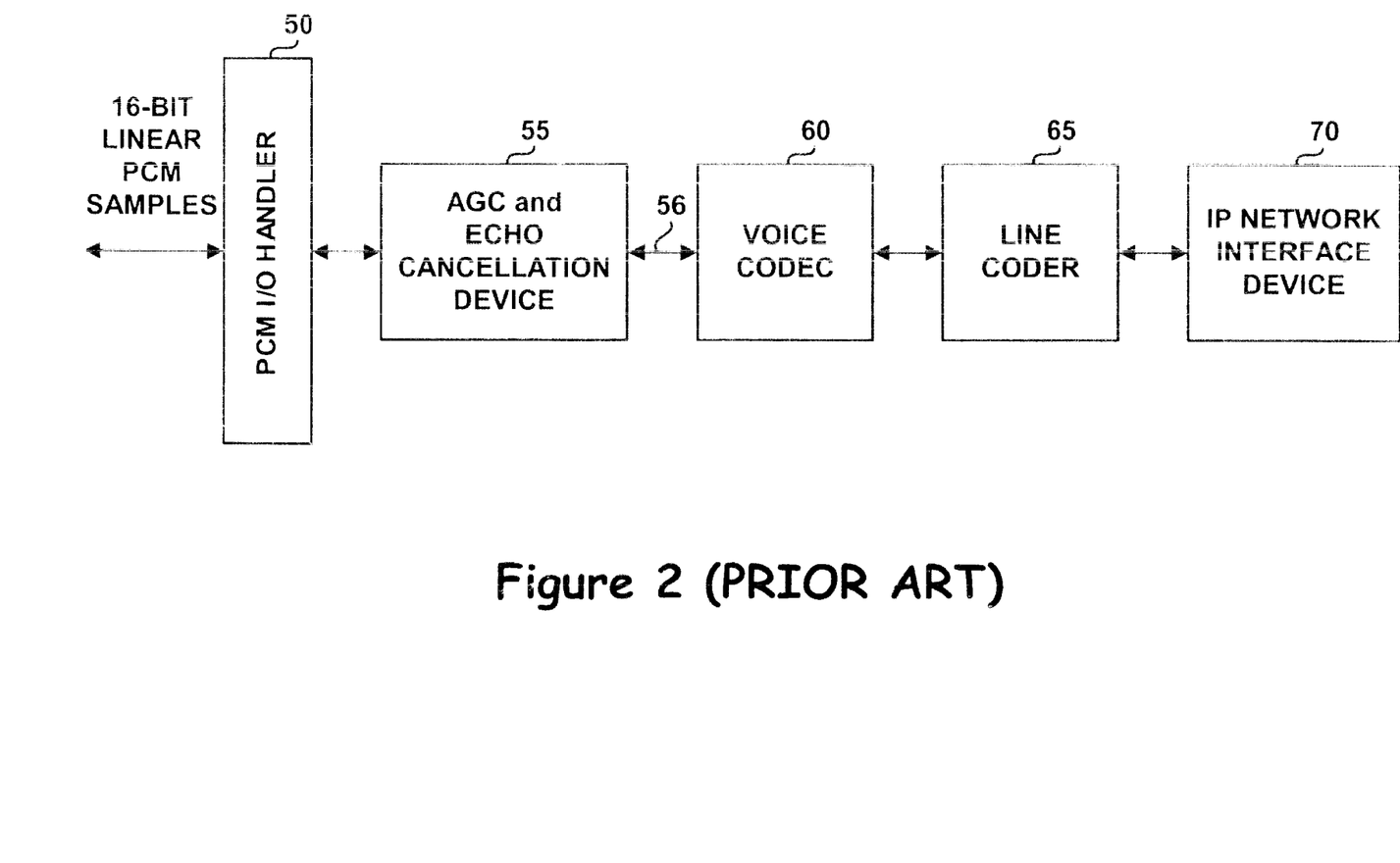
FIG. 2 is a block diagram of the speech processing hardware in a conventional telephone gateway.

All digital processing of speech samples and associated control tasks are done by special hardware in each telephone gateway in response to appropriate analog (e.g., from modem 36) or digital (e.g., DSO signals from the PSTN) speech samples originating in the form of spoken speech from such devices as PC 35 and telephony devices 41–44. The spoken speech samples are received via actual physical layer links 37 connecting the outside world to the telephone gateways internal speech processing hardware. A diagrammatic depiction of such hardware is shown in FIG. 2. The hardware includes a pulse code modulated (PCM) sample IO handler 50, an auto gain control (AGC) and echo cancellation devices 55, a voice coder/decoder (CODEC) 60, a line coder 65 and an IP network interface device 70 configured to operate in a known fashion. A typical input to voice CODEC 60, for example, might be an 8 kHz 16-bit linear PCM signal which corresponds to a data rate of 128 kbps (8000×16). In one implementation, CODEC 60 operates on blocks of 240 input samples 56 called frames, each frame having a duration of 30 msec (240/8000). The output of CODEC 60 is at one of two bit-rates: 6.3 kbps or 5.3 kbps. The higher rate has greater quality and the lower rate is, obviously, more bandwidth efficient. At 6.3 kbps, the length of the output codeword is 189 bits (0.03 sec×6300 bps), and at 5.3 kbps its 159 bits. The highest compression ratio is, therefore, achieved by the 5.3 kbps Codec where the input 128 kbps PCM signal is compressed 24 fold.

Figure 3:
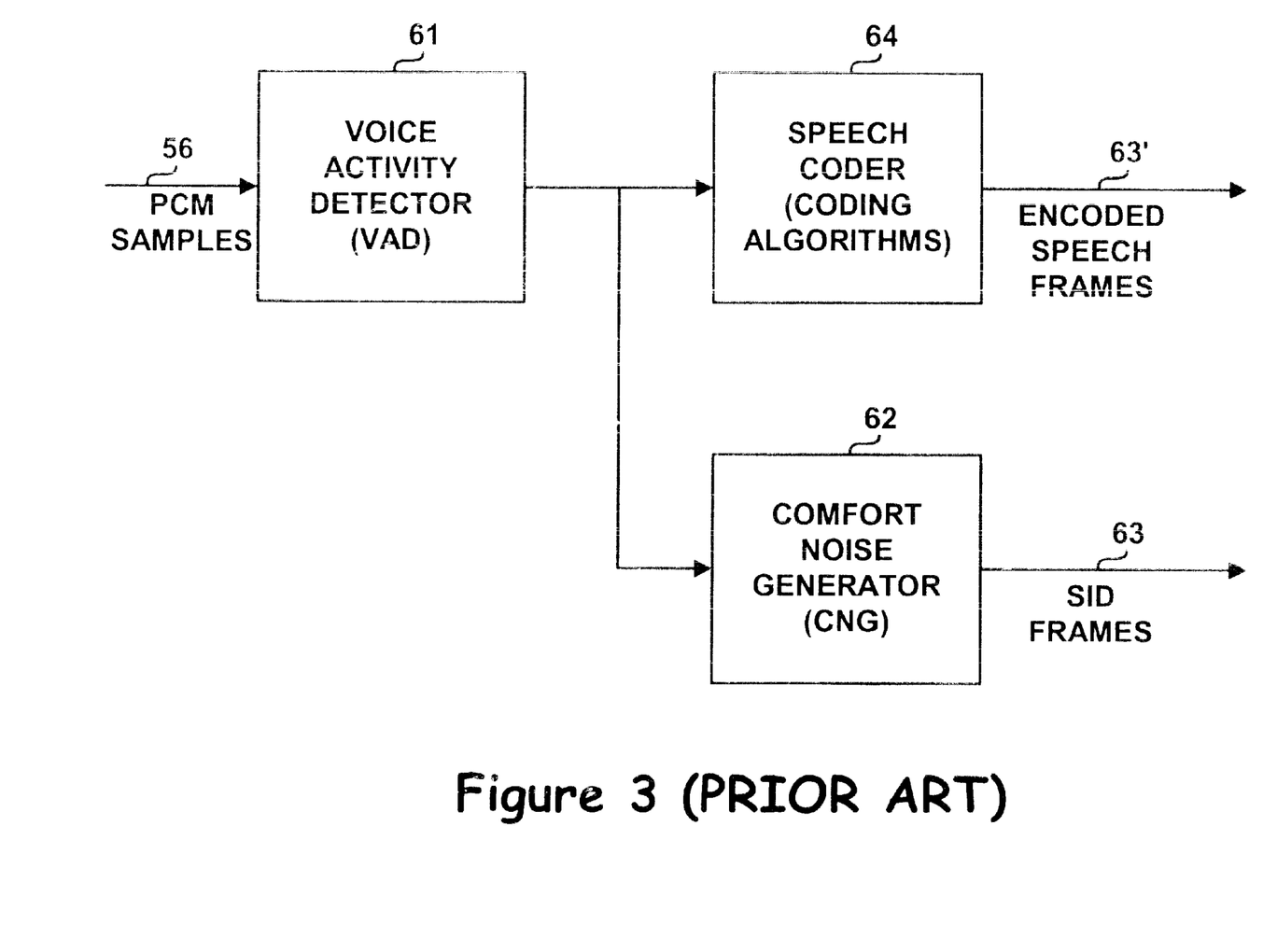
FIG. 3 is a very high level block diagram of the voice CODEC of FIG. 2 used for processing digital samples representative of voice and non-voice speech during a VoIP call session.

A block diagram of the operational processing logic of CODEC 60 is shown in FIG. 3. Discontinuous transmission (DTX) and silence compression of input samples 56 are handled by a Voice Activity Detector (VAD) 61 and by Comfort Noise Generator (CNG) 62. The VAD 61 reliably detects the presence or absence of speech and conveys that information to the CNG 62. Although this information is passed on a frame by frame basis, the determination of the presence or absence of speech is made over multiple successive frames.

The CNG 62 creates a noise signal that matches the actual background noise. It essentially computes and encodes parameters that can be used at the receiving end to synthesize this artificial noise. These parameters constitute the Silence Descriptor (SID) frames 63 which use less bits (40) than the normal speech ones and are transmitted during inactive periods. This transmission, however, is not periodic. That is, for each inactive (non-speech) frame the CNG 62 makes a decision of sending a SID frame 63 or not based on variations of the power spectrum of the background noise. As long as this spectrum remains relatively unchanged, SID frames 63 stop getting sent and the system's transmitting modules remain idle. At the receiving end, on the other hand, the decoder always uses the last SID frame 63 received to generate the silence comfort noise.

In a typical CODEC, a speech coder 64 processes the speech portion of the PCM samples output from VAD 61 to generate—using appropriate coding algorithms—encoded speech frames 63'. This processing dominates the horsepower requirements of a CODEC. Typical power consumption by coding algorithms might be 20 million instructions per second (MIPS). Comparatively, the requirements of the comfort noise generator 62 are negligible and do not exceed 1 MIPS. (The VAD 61 is immaterial to this discussion since it is common to the generation of both SID frames 63 and encoded speech frames 63'.)

A CNG 1 MIPS estimation represents normal operations where SID frames 63 are not being continuously built and sent. For peak processing estimations, however, one might assume that the background noise's power spectrum is constantly changing and new SID frames must be computed and sent continuously. Exact numbers for this peak condition are not available but, nonetheless, one can safely estimate that they do not exceed a very generous 5 MIPS. To verify this, one can use the ratio of the number of bits in a SID frame 63 to the number of bits in a regular speech frame as a rough indicator. The minimum such ratio is for a 5.3 kbps coder which is 40/159=0.251. Multiplying this number with 20 MIPS gives us 5.03 MIPS as the horsepower needed to compute a SID frame 63. The 20 and 5 MIPS estimates produce a 4:1 ratio between full-time and idle-time frame generation processing. (This very rough estimation assumes that SID frame generation is as complex as that of encoded speech frame generation and that the relationship between number of bits and MIPS is linear, which is not remotely the case. Nonetheless, given that the generation of comfort noise parameters is far less complex than coding, 5 MIPS can be taken as an adequate estimate to show the difference in bandwidth resource utilization between full-time speech processing (when both encoded speech frames and SID frames are being generated) and idle-time processing (when only SID frames are being generated.)

The inventors have determined that what is needed are ways to better manage processing resources during multiple VoIP call sessions by freeing up (or reassigning) resources during idle-time processing. Of course, paramount to any efficient alternative solution is that the VoIP call session's physical link remain substantially uninterrupted and that no significant impairment of the call is noticeable by the participants.

SUMMARY

The invention provides a system and method for managing resources in a distributed Voice-over-IP (VoIP) speech coder pool system arrangement including multiple speech coders each comprised of a first number of front-end modules and a second number of back-end modules. Each call session has assigned thereto a front-end module and a back-end module cooperatively functioning as a speech coder. In the preferred embodiment, voice samples are passed through the assigned front-end module to the back-end module where they are encoded and placed as speech frames on the IP network. As soon as absence of speech is detected by a Voice Activity Detector (which may or may not be shared by multiple front-end modules), processing is handed over to the front-end module freeing up the back-end module to sit idle resulting in reduced power consumption. In alternate embodiment, the freed-up back-end module is reassigned to a new VoIP call session for maximum resource utilization.

Each front-end module is configured for keeping alive the physical layer link between the telephony user and the telephony gateway during non-speech portions of the call, while at the same time allowing speech processing hardware strategically located in the back-end modules. In this manner, the call session is allowed to be kept active in a reduced rate mode throughout the duration of the idle call session. The reduced rate idle-mode requires less processing capability than the high rate data-mode and can be maintained by front-end modules of lower capability and lower cost. Because the processing of the idle data are now handled by the front-end module, the back-end module may be reassigned to another call session at that point; or to the extent the front-end to back-end link is maintained, the back-end processing demands are reduced which may allow the back-end module to provide service to another call session. When speech data appear on the subscriber link, a negotiation may be performed to bring any of the available high-capability back-end modules back on line.

In another preferred embodiment, the front-end modules are provided with sufficient processing power, memory and programmed functionality to maintain more than one subscriber link active, at least during idle processing of such links.

In yet another embodiment, the front-end modules and back-end modules are each fully functional encoder devices capable of operating as either front-end devices or back-end devices, on an as needed basis.

In another preferred embodiment, the front-end modules are connected to the public switched telephone system via DS0 circuits, which may be delivered physically as DS1, DS3, or any other commonly provisioned organization of circuits.

In another preferred embodiment, the front-end mode are connected via an appropriate voice-band or broadband type modem link to the call participant.

The details of one or more embodiments of the invention are set forth in the accompanying drawings and the description below. Other features, objects, and advantages of the invention will be apparent from the description and drawings, and from the claims.

DETAILED DESCRIPTION

The following description is made in the context of using the invention in a telephone gateway as might be employed in a VoIP network as shown in FIG. 1. Related aspects of the invention is a voice-band solution described in the co-pending US application, titled "Distributed Voice-Band Modem Pool with Front-End Idle Mode Processing", and in the xDSL solution described in the co-pending US application, titled "Distributed xDSL Modem Pool with Front-End Idle Mode Processing", both of which were filed contemporaneously with the present application.

The invention provides a system and method for freeing up voice coder resources, preferably located at a central location, to make resources available for new telephony call sessions. This generally involves reassigning certain resources set up to process a call session upon detection of a transition of the call session from active data, when user speech data are being sent, to idle-mode, when no speech data are being sent.

The invention differs from prior art resource management approaches in that the physical layer link is maintained throughout the duration of the telephony call session. While in accordance with the preferred embodiments some of the resources are dynamically reassigned, sufficient resources are reserved to the call session to keep the link alive. Accordingly, as active speech data appear on the link indicative of a transition back to active-mode, the limited reserved resources request at that time that additional resources be provided to handle the processing of the incoming speech samples.

A key aspect of the invention is that because the physical layer link to the user terminal device is maintained, the user at that device who was previously sitting idle experiences little to no delay in the transition back to active-mode, and at no time has the call session been prematurely interrupted for lack of voice activity. This is generally achieved by having the Voice Activity Detector (VAD) identify a break in speech from the incoming voice samples, which in turn allows the front-end module to coordinate the back-end module relinquishing control of speech processing functions until speech type data are re-detected by the VAD.

Given a limited number of speech coders available to handle incoming calls and an equal number of active call sessions, a distributed speech coder pool solution as, will be described herein below, allows new telephony call sessions to be initiated without in any way detrimentally affecting or tearing down active call sessions which may or may not be presently idle.

The invention aims to take advantage of the benefits of a so-called distributed speech coder (CODEC) pool system architecture. A distributed speech coder pool generally encompasses the notion of distributed voice CODECs extended to operate in banks or pools; or other equipment that performs the functions of CODECs for a plurality of subscriber lines. Distributed CODEC processing as shall be described herein below is analogous to the concept of distributed modem pools, including voice-band and broadband type modems pool environments as has been described in greater detail in related co-pending U.S. patent application Ser. No. 09/164,879 filed Oct. 1, 1998 titled "System and Method for Providing High-Speed Data Access Using a Distributed Modem", which application is incorporated herein by reference.

Figure 4:
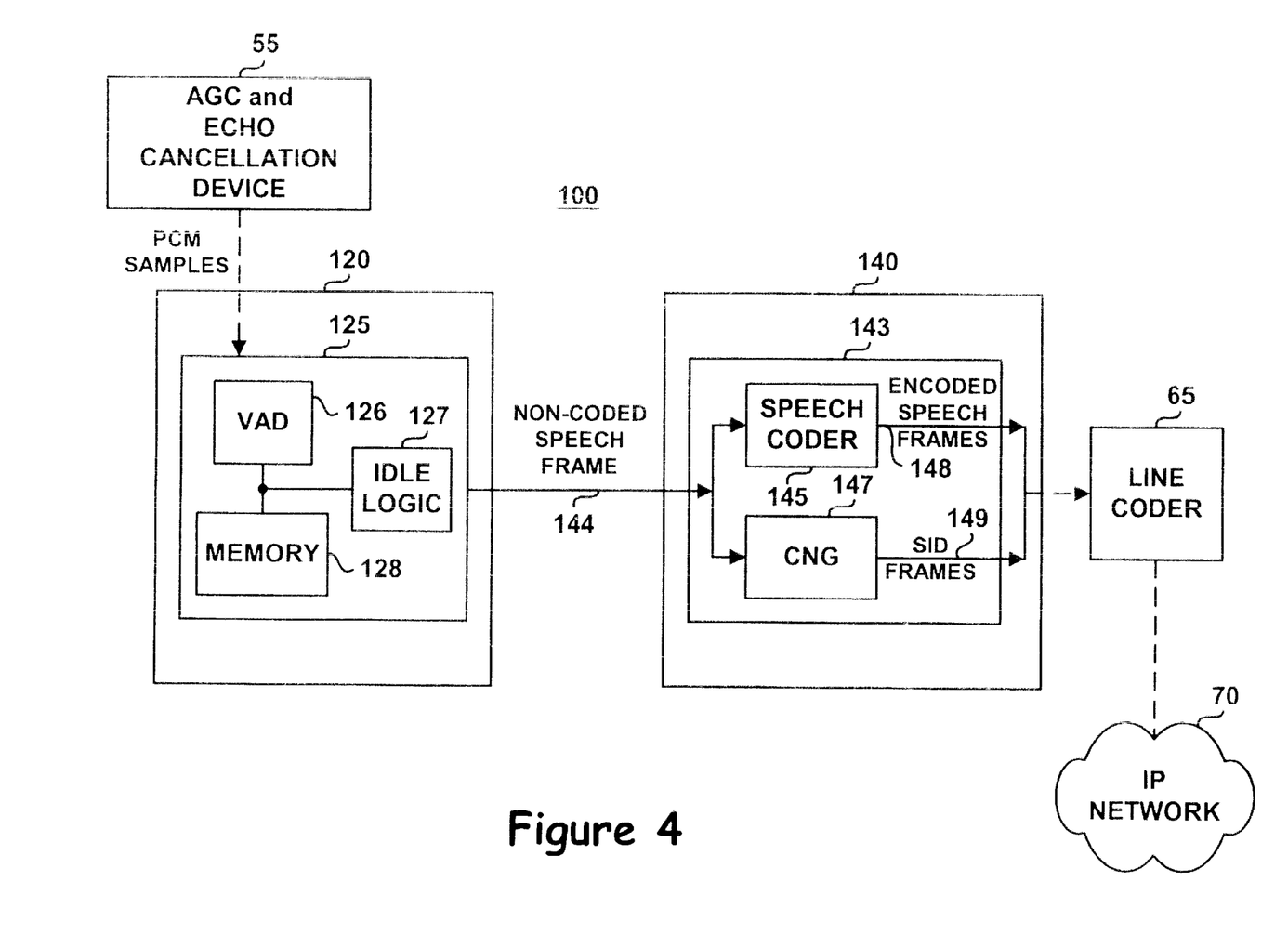
FIG. 4 is a block diagram generally showing a distributed speech coder having a front-end module and a back-end module in accordance with the present invention.

The basic operation of a distributed CODEC 100 generally configured in accordance with the invention is shown in block diagrammatic form in FIG. 4.

Distributed CODEC 100 includes a front-end module 120 and a back-end module 140 having an interconnection path/bus 144. The distributed CODEC 100 is "distributed" because the first-end module 120 is physically separate but electrically coupled to the back-end module 140. For example, the front-end module 120 and the back-end module 140 may be on separate circuit boards, or on entirely separate chassis. The front-end module 120 may be separated from the back-end module 140 by distances that may be measured in fractions of an inch, or in miles.

Referring to the VoIP network configuration shown in FIG. 1, distributed CODEC 100 may reside as part of the CODEC hardware co-located in any one of telephone gateways 20, 25, 30 and coupled to receive voice/speech samples from, for example, either a PC 35 user or a telephony device 41–44 user over an appropriate subscriber link coupled to the voice CODEC as shall be described in greater detail below.

Figure 5:
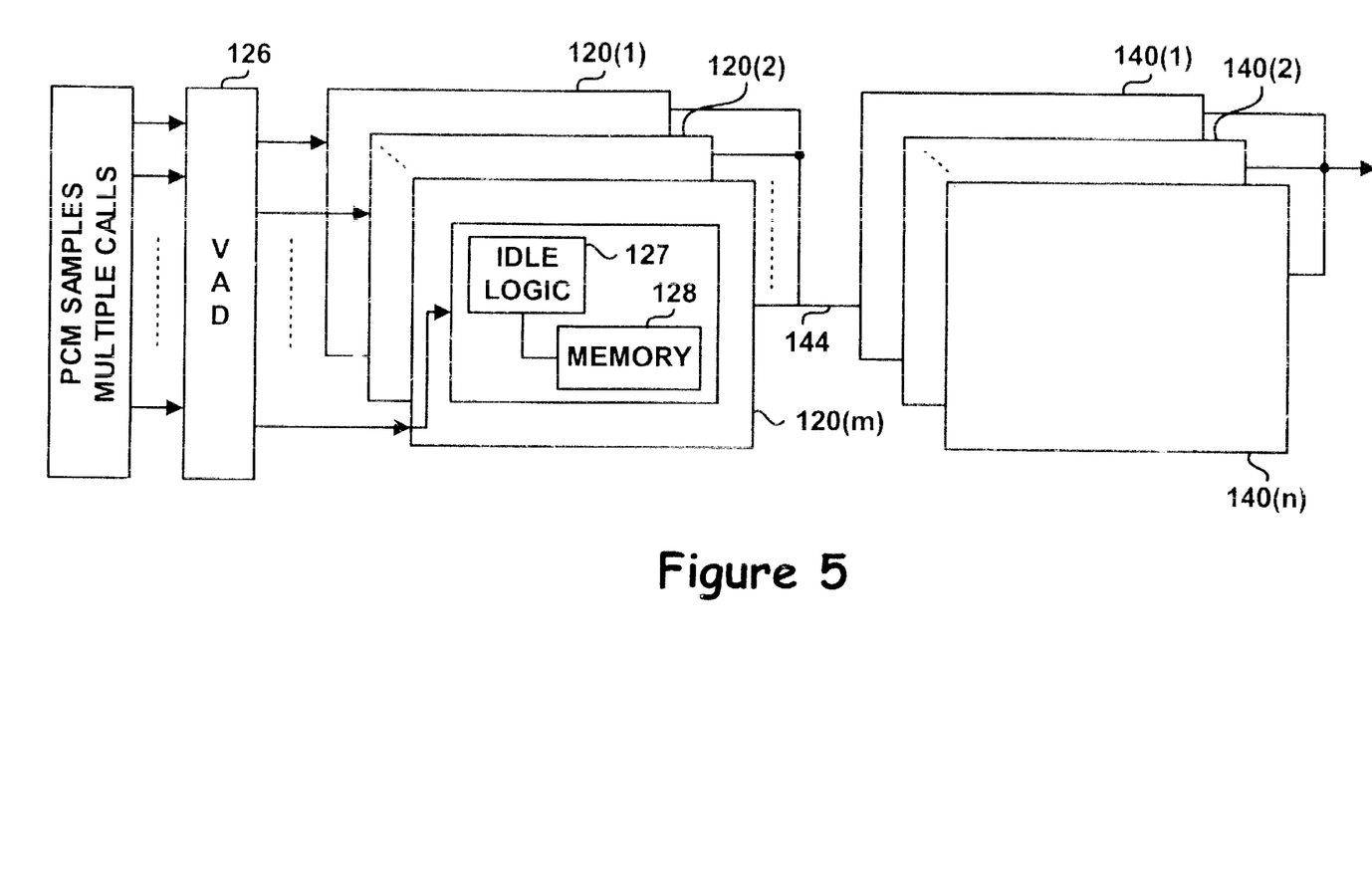
FIG. 5 is a block diagram of a distributed speech coder pool system as might be employed in a telephone gateway including a plurality of distributed. speech coders communicably interconnected in accordance with a preferred embodiment of the present invention.

FIG. 5 is a block diagram of a distributed speech coder pool system as might be employed in a telephone gateway including a plurality of distributed speech coders communicably interconnected in accordance with a preferred embodiment of the present invention.

In accordance with a first preferred embodiment, the front-end module 120 would be coupled to receive speech data samples over a voice-band, broadband or the like subscriber line 12 over which a subscriber link (including a physical layer link) between an appropriate modem-equipped user terminal device (36) is established during a given call session. (As is well known, modem-equipped user terminal devices essentially encode sourced speech as analog signals at very high data rates.) Once received at the telephone gateway (20), the analog modem representation of speech signals are converted by appropriate circuitry and associated coding algorithms, into, for example, a 16-bit linear PCM sample stream for processing by voice processing hardware substantially as explained above in connection with the description of FIG. 2.

In an alternate embodiment, the sourced speech originates from a telephony device such as telephony devices 41–44 in FIG. 1 and transmitted to the telephony gateway in any one of various known ways, including as a digital voice stream over a DS0 link from the PSTN 40 to the telephony device. In the case of a cellular or two-way radio implementation, the sourced speech may arrive at the appropriate telephony gateway 25, 30 over the PSTN 40 as shown in FIG. 1, or by way of a direct link (not shown) between the cellular or two-way infrastructure to the appropriate telephony gateway. The sourced speech is received by telephony gateways 25, 30 as a digitally represented packet frame and may be converted as necessary into, for example, a 16-bit linear PCM sample stream for processing in the same way as might be processed the modem received signals in the preceding embodiment. The present invention aims to utilize a distributed CODEC architecture within a telephony gateway (versus the nondistributed architecture of FIG. 3) to process the incoming PCM sample stream in a manner which maximizes use of CODEC resources during idle (non-speech) portions of an ongoing (uninterrupted) VoIP call session.

In a distributed CODEC 100 as contemplated herein in accordance with a preferred embodiment shown in FIG. 4, the front-end module 120 includes front-end module controller 125 which may comprise Voice Activity Detector (VAD) 126, idle processing logic 127 and memory 128 for analyzing the incoming PCM samples to determine if there is a break in speech of sufficient length (more than a few seconds) and take appropriate action. The back-end module 140 is connected to the front-end module 120 and receives the PCM samples by way of interconnection path/bus 144 therefrom when speech is detected and receives no samples otherwise.

The back-end module 140 comprises a back-end module controller 143 including at least a conventional speech coder 145 and Comfort Noise Generator 147 for isolating speech patterns from the PCM samples and generating therefrom appropriate encoded speech frames 148 and SID frames 149, respectively. Frames 148 and 149 are then communicated to, for example, a line coder 65 and IP network interface device 70 for transmission as packetized IP protocol-compatible data over an IP network, such as the internet, in a conventional manner.

In the event of a break in speech (i.e, no encoded speech frames to be generated by the speech coder 145), rather than tearing down the call, the front-end module 120 will instead take action to cause the back-end module controller 143 to relinquish control of the resources assign to the VoIP session. Once control is relinquished, the back-end module 140 may be dynamically assigned to another call or put on stand-by (requiring little or no MIPS resources) until the break in speech is ended and voice is again detected by the VAD 126 in front-end module 120.

In an alternate implementation shown in FIG. 5, the VAD 126 is external to the front-end module and shared by each of plural parallel arranged front-end modules 120(1)–120(m) cooperatively defining a pool 120' of front-end modules. The pool 120' of front end modules 120(1)–120(m) in turn is connected to a pool 140' of back-end modules 140a–140n. In this regard, it should be appreciated that since the back-end modules may be dynamically assigned on an as needed basis, a one-to-one correspondence with front-end modules 120 is not needed (i.e., m not equal to n).

By allowing the VAD 126 functionality to be shared among plural front-end modules 120, the latter can be provided at very low cost as such would require only reduced processing capability limited to transitioning resources—including back-end resources—to and from idle-mode.

Also, while in the illustrative embodiment certain signal processing functions such as auto gain control and echo cancellation are not included as part of the distributed CODEC functionality, such processing and other similar speech processing functions may be optionally included therein and performed preferably by, for example, by appropriate circuitry disposed within the front-end modules 120(1)–120(m).

The purpose of the idle processing logic 127 is to maintain the corresponding call session physical layer link alive as the call session transitions into idle (non-speech) mode, and operates to reestablish control of the same or different back-end module 140 as the call session transitions back to active (speech) mode.

In accordance with a preferred embodiment, it is envisioned that the front-end modules are provided with sufficient processing power, memory and programmed functionality to maintain more than one subscriber link active, at least during idle processing of such links.

In yet another embodiment, the front-end modules and back-end modules are each fully functional encoder devices capable of operating as either front-end devices or back-end devices, on an as needed basis.

The speech coder 145 may include a processing element to process the data from the front-end module 120 and to perform high level functions such as, for example, data compression and error detection and correction. The speech coder 145 and CNG 147 may be constituted by a single processing element capable of performing all necessary high level functions. The single processing element may include a digital signal processor (DSP) or a general purpose processor. Alternatively, more than one processor may be used.

Figure 6:
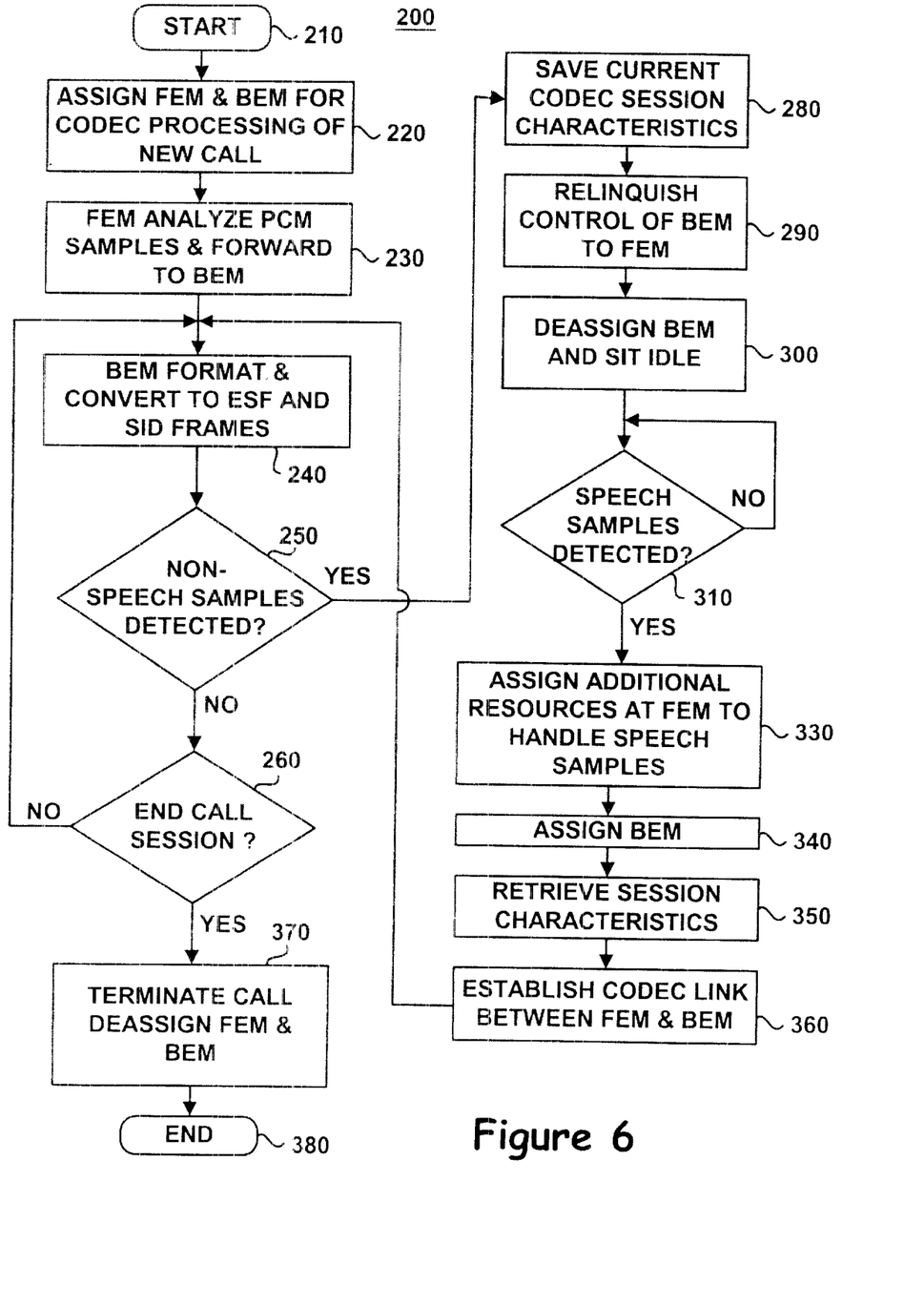
FIG. 6 shows the operational flow for performing idle-mode processing in response to a detection of non-speech data in accordance with the preferred embodiment.

FIG. 6 shows an operational flow routine 200 for performing idle-mode processing in response to a detection of non-speech data in accordance with the preferred embodiment.

At step 220, a call session is initiated over a subscriber link for establishing a VoIP call session between a telephony device (or PC user) with an associated telephony gateway, as generally described above. The telephony gateway includes a plurality of modules including front-end modules 120(1)–120(m) and back-end modules 140(1)–(n). Call initiation involves assigning a front-end module 120 and a back-end module 140 to establish the current voice call session.

It is contemplated that such resource management may be performed dynamically using predefined statistical multiplexing techniques. A dedicated central processing unit external to the modules may be employed to assign and deassign resources. In an alternate solution, resource management is performed by the modules themselves and preferably by the communicably coupled DSPs in the respective modules.

The front-end module 120 assigned to the current call session analyzes the incoming speech PCM data sample stream and then sends them over link 144 to the assigned back-end module 140 (step 230). The back-end module 140, in turn, formats and converts the digital samples into intelligible encoded speech frames packets and simultaneously also generates SID frames based on noise level patterns identified from the digital samples (step 240).

Before (or as part of) the CODEC module setup, session characteristics associated with the call and the corresponding subscriber link are first saved (step 280) to allow for rapid transition from no back-end module functionality to almost instantaneous assignment of thereof.

In accordance with a preferred embodiment, the back-end module 140 may them be put back in the "available" list of modems in the modem pools, and thus is de-assigned from the call session (steps 290, 300). Such deassignment may be on a temporary or permanent basis, based on system designer options. Of course, it is also possible to maintain the assignment of the back-end module 140 to the current call session but configured to also simultaneously encode voice samples from other incoming calls on an as needed basis.

Upon relinquishing of non-speech sample processing by the back-end module 140, control of non-speech processing is exclusively turned over to the front-end module 120, and more specifically, to the associated idle-processing logic 127. The VAD 126 monitors the incoming sample stream for speech data all the while keeping the physical layer link alive with the call participant (step 310).

Upon detection of speech type samples (i.e., switch to active-mode), action is taken by the front-end module 120 to have additional resources provided to handle the full rate of incoming active data (step 330). Such action may involve (or be followed by) the assignment of a back-end module 140 (step 340), retrieval of saved session characteristics (step 350), and establishment of communications between the front-end module 120 and newly assigned back-end module 140 (step 360) in a seamlessly quick manner using the saved session characteristics.

Once back in active-mode processing, each digitized sample is passed from the front-end module 120 to the new back-end module 140 in the same manner as prior to the idle-mode condition. It should be appreciated that resources may be assigned and de-assigned indefinitely while the link is kept alive at the user terminal device or until such time as a timeout condition is reached. When the call session is terminated for whatever reason, all resources (modules 120, 140) are de-assigned and placed back in the pool of available modems (step 380, 390).

Thus, in the preferred embodiment just described, when a front-end module identifies that its associated call session has entered idle-mode, the associated back-end module relinquishes control throughout the duration of the call session. Because the processing of the idle data are now handled by the front-end module, the back-end module may be reassigned to another call session at that point; or to the extent the front-end to back-end link is maintained, the back-end processing demands are reduced which may allow the back-end module to provide service to another call session.

It should be appreciated that the relinquishing of control by an assigned back-end module in response to a detection of non-speech data amounts to a hand-over between front-end and back-end. Such hand-over should realistically occur within a 30 msec window. As discussed above, a CODEC typically receives frames of voice samples every 30 msec. Accordingly, all compression operations must complete in a 30 msec time period before the next frame arrives. For purposes of the present invention, a limitation for successful implementation demands that the sum of the time it takes to perform a hand-over and the time needed to produce a compressed speech frame must not exceed 30 msec.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CDROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. In a telephony gateway including a distributed speech coder pool system comprising a plurality of front-end modules and a plurality of back-end modules capable of contemporaneously servicing a plurality of Voice-over-Internet Protocol (VoIP) call sessions, a method of maintaining a physical layer link between the telephony gateway and users involved in a given call session for duration of call session, each call session being serviced by both a front-end module and a back-end module dynamically assigned thereto at call setup, the method comprising:

(a) receiving, by a front-end module servicing a present call, non-coded speech frame information;
  (b) encoding, by a back-end module servicing the present call, the non-coded speech frame information to generate at least encoded speech frames in an internet protocol compatible format;
  (c) analyzing the non-coded speech frame information to identify a break in speech during the call session;
  (d) relinquishing control by the back-end module in response to a break in speech;
  (e) continuing to analyze subsequent non-coded speech information after the break in speech to identify when speech is transmitted; and
  (f) upon detecting that speech is transmitted, assigning a back-end module to generate associated encoded speech frames.

2. The method of claim 1, wherein the back-end module assigned in step (f) is different than the back-end module in step (b).

3. The method of claim 1, wherein the back-end module assigned in step (f) is the same as the back-end module in step (b).

4. The method of claim 1, wherein the back-end modules generate Silence Descriptor (SID) frames as well as encoded speech frames in response to non-coded speech frames received from associated front-end modules during transmission of speech.

5. The method of claim 1, wherein the non-coded speech frames are sourced from a telephony device.

6. The method of claim 5, wherein the telephony device is coupled to the telephony gateway via the Public Switched Telephone Network (PSTN).

7. The method of claim 6, wherein the telephony device is a wireline telephony device.

8. The method of claim 6, wherein the telephony device is a wireless telephony device.

9. The method of claim 5, wherein the telephony device is coupled to the telephony gateway via the a private telephony network capable of converting speech into packetized non-coded speech information.

10. The method of claim 9, wherein the telephony device is a wireline telephony device.

11. The method of claim 9, wherein the telephony device is a wireless telephony device.

12. The method of claim 1, wherein the non-coded speech frames are sourced from a PC user coupled to a modem.

13. The method of claim 12, wherein the modem is a voice-band modem.

14. The method of claim 12, wherein the modem is an xDSL type modem.

15. The method of claim 1, wherein the analyzing steps are performed by a Voice Activity Detector (VAD) within the front-end module.

16. The method of claim 1, wherein the analyzing steps are performed by a Voice Activity Detector (VAD) located external to the front-end module.

17. The method of claim 1, wherein the front-end module includes idle processing logic for coupling the front-end module to multiple back-end modules.

18. The method of claim 1, wherein the front-end modules and the back-end modules include functionality to function as both front-end and back-end modules but not both simultaneously.

19. A distributed speech coder pool system, for use in a telephony gateway, including a plurality of front-end modules and a plurality of back-end modules capable of contemporaneously servicing a plurality of Voice-over-Internet Protocol (VoIP) call sessions, the distributed speech coder pool system maintaining alive a physical layer link between the telephony gateway and users involved in a given call session for duration of call session, each call session being serviced by both a front-end module and a back-end module dynamically assigned thereto at call setup, the system comprising:

(a) a front-end module for servicing during a present call non-coded speech frame information;

(b) a back-end module for servicing during the present call the non-coded speech frame information to generate at least encoded speech frames in an internet protocol compatible format when the non-coded speech information includes speech;

(c) a Voice Activity Detector (VAD) analyzing incoming non-coded speech frame information to be processed by the front end module to identify a break in speech during the call session and cause the back-end module to relinquish control.

20. The system of claim 19, wherein the back-end module includes a Comfort Noise generator (CNG) for generating Silence Descriptor (SID) frames.

21. The system of claim 19, wherein the non-coded speech frames are sourced from a telephony device.

22. The system of claim 21, wherein the telephony device is coupled to the telephony gateway via the Public Switched Telephone Network (PSTN).

23. The system of claim 22, wherein the telephony device is a wireline telephony device.

24. The system of claim 22, wherein the telephony device is a wireless telephony device.

25. The system of claim 21, wherein the telephony device is coupled to the telephony gateway via the a private telephony network capable of converting speech into packetized non-coded speech information.

26. The system of claim 25, wherein the telephony device is a wireline telephony device.

27. The system of claim 25, wherein the telephony device is a wireless telephony device.

28. The system of claim 19, wherein the non-coded speech frames are sourced from a PC user coupled to a modem.

29. The system of claim 28, wherein the modem is a voice-band modem.

30. The system of claim 28, wherein the modem is an xDSL type modem.

31. The system of claim 19, wherein the (VAD) is located within the front-end module.

32. The system of claim 19, wherein the (VAD) is located external to the front-end module.

33. The system of claim 19, wherein the front-end module includes idle processing logic for coupling the front-end module to multiple back-end modules.

34. The system of claim 19, wherein the front-end modules and the back-end modules include functionality to function as both front-end and back-end modules but not both simultaneously.

* * * * *